(12) United States Patent
Schaller et al.

(10) Patent No.: US 7,449,162 B2
(45) Date of Patent: Nov. 11, 2008

(54) DEVICE FOR TREATMENT OF EXHAUST OF AN INTERNAL COMBUSTION ENGINE

(75) Inventors: Johannes Schaller, Leonberg (DE); Markus Buerglin, Ditzingen (DE); Ilona Ullmann, Korntal-Muenchingen (DE); Gudrun Bieder, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 10/532,625

(22) PCT Filed: Oct. 27, 2003

(86) PCT No.: PCT/DE03/03562

§ 371 (c)(1),
(2), (4) Date: Apr. 25, 2005

(87) PCT Pub. No.: WO2004/042208

PCT Pub. Date: May 21, 2004

(65) Prior Publication Data

US 2006/0051276 A1 Mar. 9, 2006

(30) Foreign Application Priority Data

Nov. 6, 2002 (DE) ............... 102 51 588

(51) Int. Cl.
*B01D 53/92* (2006.01)
*B01D 53/94* (2006.01)
*B01J 19/00* (2006.01)
*F01N 3/08* (2006.01)
*F01N 3/18* (2006.01)

(52) U.S. Cl. ............ 423/212; 423/213.2; 423/235; 423/239.1; 422/168; 60/274; 60/286; 60/295; 60/303

(58) Field of Classification Search ............... 423/212, 423/213.2, 235, 239.1; 422/168; 60/274, 60/286, 295, 303
See application file for complete search history.

(56) References Cited

U.S. PATENT DOCUMENTS

| 5,884,475 | A | 3/1999 | Hofmann et al. | |
| 6,442,932 | B1 | 9/2002 | Hofmann et al. | |
| 2001/0053342 | A1* | 12/2001 | Marko et al. | 423/235 |
| 2004/0025498 | A1* | 2/2004 | Lambert et al. | 60/286 |
| 2004/0115110 | A1* | 6/2004 | Ripper et al. | 423/235 |
| 2005/0011183 | A1 | 1/2005 | Ripper et al. | |

(Continued)

FOREIGN PATENT DOCUMENTS

DE 44 32 577 A1 3/1996

(Continued)

OTHER PUBLICATIONS

The English abstract of DE 199 35 920 A1 published Mar. 15, 2001.*

*Primary Examiner*—Timothy C Vanoy
(74) *Attorney, Agent, or Firm*—Ronald E. Greigg

(57) ABSTRACT

A method and a device for treatment of the exhaust of an internal combustion engine in which a fluid is used as an auxiliary agent for the treatment; a partial chemical conversion of the auxiliary agent is at least occasionally stimulated in order to produce a substance that reduces the freezing point of the fluid when the temperature of the fluid falls below a critical value.

20 Claims, 1 Drawing Sheet

U.S. PATENT DOCUMENTS

2006/0147362 A1* 7/2006 Nissinen et al. .......... 423/239.1
2007/0048204 A1* 3/2007 Mital ...................... 423/239.1
2007/0157602 A1* 7/2007 Gschwind ................... 60/274
2007/0163238 A1* 7/2007 Gerlach ....................... 60/286

FOREIGN PATENT DOCUMENTS

| | | |
|---|---|---|
| DE | 199 35 920 A1 | 3/2001 |
| WO | WO 00/30733 A1 | 6/2000 |
| WO | WO 02/057603 A1 | 7/2002 |

* cited by examiner

DEVICE FOR TREATMENT OF EXHAUST OF AN INTERNAL COMBUSTION ENGINE

CROSS-REFERENCE TO RELATED APPLICATIONS

This application is a 35 USC 371 application of PCT/DE 03/03562 filed on Oct. 27, 2003.

BACKGROUND OF THE INVENTION

1. Field of the Invention

The invention is directed to an improved method of and treatment of the exhaust of an internal.

2. Description of the Prior Art

A method and a device for treatment of exhaust gas are already known from DE 199 35 920, in which in order to prevent a urea/water solution from freezing at −11° C., heating tubes are provided in the reducing agent reservoir so that the reducing agent reservoir can be heated when reducing agent temperatures fall below 20° C.

SUMMARY AND ADVANTAGES OF THE INVENTION

The method and device according to the present invention, have the advantage over the prior art of achieving a reduction in the freezing point of the fluid through concerted use of a conversion reaction of the auxiliary agent, in particular a decomposition reaction, without having to accept an appreciable temperature increase in the fluid system. At low outside temperatures, constant reheating is no longer necessary because after a concerted chemical conversion, ice no longer forms, even at low temperatures, and the heating does not have to be activated as long as the fluid contains a sufficient concentration of the substance produced by the conversion reaction.

Advantageous modifications and improvements of the methods and devices are also disclosed. It is particularly advantageous to carry out the stimulation in a partial region of the fluid volume contained in the tank and/or in lines so as to effectively enrich the fluid with the substance, without appreciably increasing the average temperature of the fluid.

It is easy to use the concerted decomposition of urea into ammonia to prevent the danger of freezing and thus the attendant risk of damage to lines and/or other system components, despite low outside temperatures and despite only an insignificant increase in the temperature of the fluid on average chronologically and spatially.

BRIEF DESCRIPTION OF THE DRAWINGS

Other features and advantages of the invention will become apparent from the description contained herein below, taken in conjunction with the single drawing figure, which shows a system for selective catalytic reduction of nitrogen oxides in the exhaust of an internal combustion engine.

DESCRIPTION OF THE PREFERRED EMBODIMENTS

Figure 1:
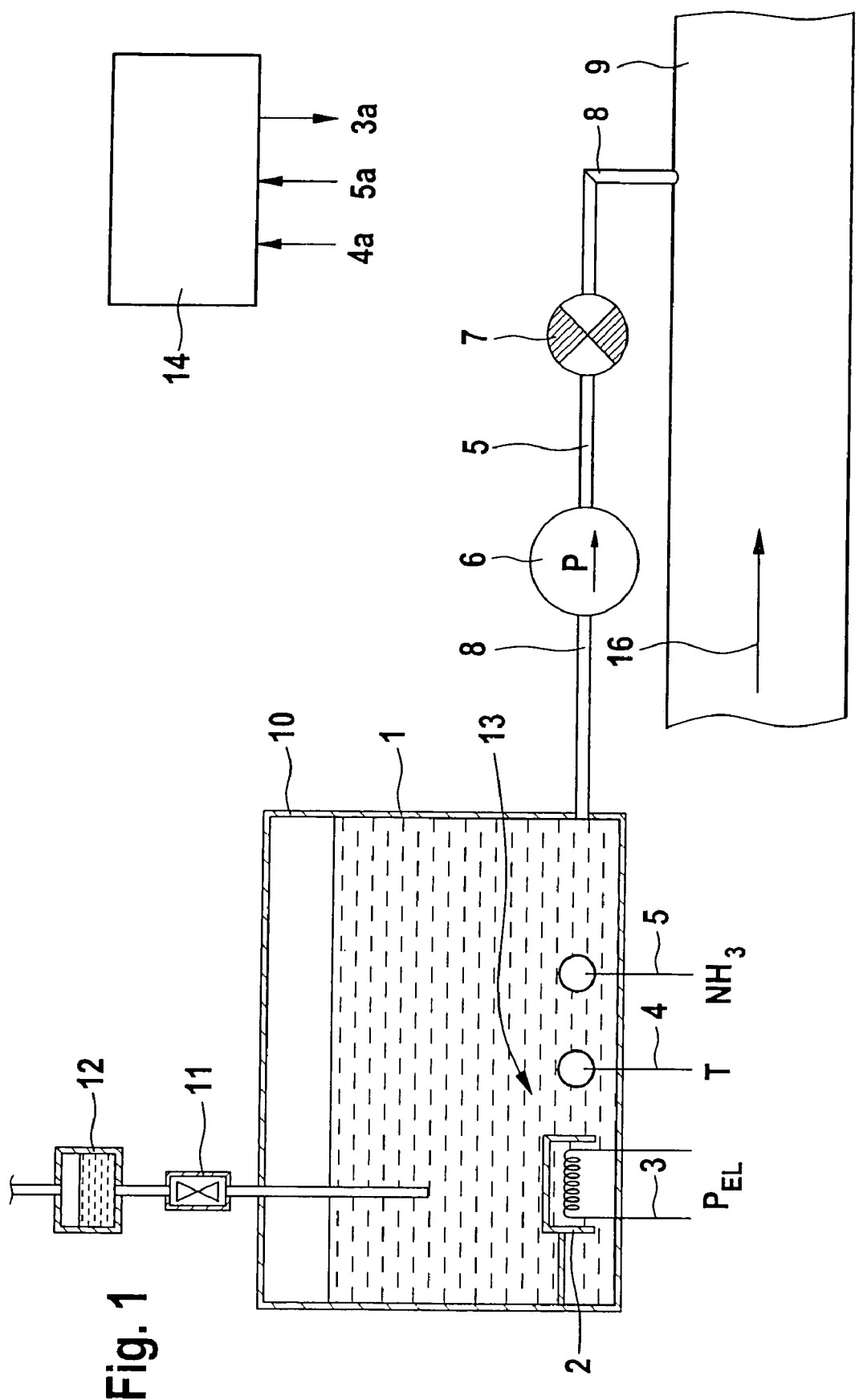

In the sole drawing figure, the exhaust line 9 represents the exhaust line of an internal combustion engine, in particular a diesel engine of a motor vehicle. The exhaust 16 flows from the internal combustion engine through the exhaust line 9, passes a urea/water solution line (UWS line) 8 connected to the exhaust line 9, and finally arrives in a catalytic converter, not shown in detail, for selective catalytic reduction of nitrogen oxides contained in the exhaust. Downstream of the selective catalytic reduction converter (hereinafter, SCR), the exhaust flows through other devices, not shown in detail, for example other catalyzing units and/or a muffler, into the open-air. At the end opposite from the region feeding into the exhaust line, the UWS line 8 is connected to a urea/water solution tank 10. Between the tank 10 and the exhaust line 9, the line 8 contains a pump 6 and, between the pump 6 and the exhaust line 9, a metering valve 7 that can be cyclically triggered. The tank 10 contains a urea/water solution with a urea content of for example 32.5% by weight. In a partial volume 13 of the tank 10 that is disposed in the lower region of the tank in the current exemplary embodiment, an electrical heater 3 is provided; the supply of electrical power to the heater of the UWS in the partial volume is schematically indicated by the letters $P_{EL}$. On the upper side oriented toward the surface of the urea/water solution in the tank, a separating element 2 that is fastened to the side region of the tank forms an upper boundary of the heater 3, which is embodied as an electric heating coil. This boundary serves to define the region in which a significant heating or temperature increase of the fluid in the tank can occur. Lateral to the separating element and adjacent to it, a temperature sensor 4 and an ammonia sensor 5 are provided in order to determine the temperature and the ammonia concentration in the heatable partial volume. Above the fluid level of the urea/water solution, the tank 10, which can be closed by means of a closure device not shown in detail, is equipped with a pressure relief valve 11 that allows excess gas pressure to escape via a washing bottle 12 to which it connects. In addition, an electronic control unit 14 is provided that calculates, among other things, the intrinsically known functions of metering the urea/water solution into the exhaust train as a function of engine and/or exhaust parameters that are supplied to the control unit in a manner not shown in detail after being measured in the engine or exhaust train. In addition, this control unit 14 is connected to the temperature sensor 4 in order to evaluate a temperature signal 4a and is connected to the ammonia sensor 5 in order to evaluate an ammonia concentration signal 5a. A control signal line 3a can, for example, trigger a power transistor circuit, not shown in detail, in order to regulate the electrical heating capacity of the electric heater 3.

The pump 6 and the metering valve 7 are triggered via triggering lines, not shown in detail, that are connected to the control unit 14 to supply a urea/water solution in an intrinsically known fashion to the exhaust 16 in a metered form in order to achieve, in the NOx-reduction catalytic converter not shown in detail below, a reduction of the nitrogen oxides contained in the exhaust in accordance with the method of selective catalytic reduction. In this connection, within the exhaust train, ammonia is derived from the urea/water solution supplied to the exhaust train and this ammonia selectively reacts with the nitrogen oxides in the SCR catalytic converter to produce nitrogen and water. In addition to the complete conversion of the urea/water solution into ammonia in the region of the exhaust train, in a partial region of the urea/water solution system comprised of the tank 1, line 8, pump 6, and metering valve 7, according to the present invention, the urea/water solution in the partial volume 13 of the tank 10 is heated to a decomposition temperature in a range above 60° C. in order to stimulate an occasional, limited, partial decomposition reaction of urea to produce ammonia. The control unit 14 controls the heating capacity and the activation period of the heater as a function of the temperature and ammonia concentration values measured in the partial volume 13. This supply of heat occurs when a critical temperature value is reached or exceeded, which lies in a range from 0° C. to −11° C., preferably in a range from −5° C. to −10° C. In this connection, care is taken to assure a sufficiently high ammonia concentration in the entire fluid volume of the urea/water solution system in order to achieve a sufficiently significant reduction in the freezing point so that a subsequent reheating can be avoided even if the temperature falls below the critical value again. However, if the ammonia concentration has decreased to the point that a sufficient reduction in the freezing point is no longer assured, then the heating must be switched on again when the temperature falls below the critical temperature value. The ammonia concentration normally fluctuates in a range of between 7 and 20 percent, thus yielding a freezing point reduction in a range from 10K and 50K. It is particularly advantageous to establish a value of approx. 7 to 15 percent by volume of ammonia in the urea/water solution in order to reduce the freezing point of the urea/water solution from −11° C. to a range from −20° C. to −30° C. The temperature of the urea/water solution is raised by 5K to 50K on average chronologically and spatially, and the pressure in the tank increases only slightly. The pressure relief valve 11 blows off any excess pressure generated by the escape of ammonia from the urea/water solution. Before the excess pressure is released into the environment, the gas passes through the washing bottle 12, by means of which the ammonia contained in the gas can be removed from the escaping gas in order to minimize the risk of environmental damage due to escaping ammonia. Up to 700 l of ammonia can be dissolved in 1 l of water. In the current exemplary embodiment, the tank volume is 60 l, so that at atmospheric pressure, 10 times the tank volume in pure ammonia can be dissolved in 1 l of water contained in the washing bottle 12. Either the state of the water in the washing bottle is monitored by means of devices not shown in detail or the water is replaced at regular intervals (for example after a fixed number of tank refills).

In an alternative embodiment form, the escape of excess pressure in the tank 10 is not conveyed into the environment, but rather into the exhaust line in order for ammonia that may have passed through the washing bottle 12 to still be neutralized in the SCR catalytic converter and to assure an additional degree of certainty in preventing environmental damage. In an improved embodiment form, the method for the concerted decomposition of urea into ammonia in the region of the UWS system for freezing point reduction can include an additional measurement of the outside temperature so that a freezing point reduction is activated only when necessary, i.e. at low outside temperatures, particularly in the subzero range. The heating of a partial region of the UWS volume and the stimulation of a decomposition of urea into ammonia in a partial region of the UWS system can also be carried out in a part of the system other than the tank. When using a metering valve 7 in the form of an injection valve cooled with the urea/water solution, it is also possible to powerfully throttle the coolant flow of the urea/water solution so that the urea/water solution used as the coolant is heated in the desired fashion to stimulate the urea decomposition. The ammonia sensor here can, for example, be disposed in the tank while the temperature sensor is disposed in the coolant flow. This alternative, not shown in detail, comprised of also using the urea/water solution as a coolant for cooling the metering valve disposed in close proximity to the exhaust train while providing a throttling of the coolant flow, can be further improved by embodying this throttling as controllable, in particular so that it can be controlled as a function of measured urea/water solution temperatures or measured ammonia concentration values. Furthermore, in another embodiment form, the pressure relief valve 11 can be designed so as to permit a definite pressure increase in the system, which shifts the chemical equilibrium between urea and ammonia in the system further in the direction of the ammonia gas. Alternatively, an auxiliary heating system can also be used to locally heat the urea/water solution in a partial region of the tank 10 or in a partial region of the exhaust line 8 in order to lighten the load on the vehicle battery, particularly when the stimulation of the decomposition reaction is to also occur during long stops, i.e. when the engine is switched off. In other alternative embodiment forms, the method and the system can be embodied and/or improved so that a temperature gradient that is produced causes a mass transfer to occur in the system, in particular between the heated partial region and the rest of the tank region in order to be able to treat the entire urea/water solution in relatively short periods of time through the local supply of heat and to assure a rapid distribution of the generated ammonia throughout the entire system. The better the system is designed to encourage such a convection, the less energy is required because the generated ammonia is immediately distributed throughout the system and remains dissolved without immediately escaping from the aqueous solution and therefore being unavailable for reducing the freezing point.

The foregoing relates to a preferred exemplary embodiment of the invention, it being understood that other variants and embodiments thereof are possible within the spirit and scope of the invention, the latter being defined by the appended claims.

The invention claimed is:

1. A method for treatment of the exhaust of an internal combustion engine in which a fluid is used as an auxiliary agent for the treatment, the method comprising the steps of at least occasionally stimulating a partial chemical conversion of the auxiliary agent in order to produce a substance that reduces the freezing point of the fluid when the temperature of the fluid falls below a critical value.

2. The method according to claim 1, wherein the conversion of the auxiliary agent is stimulated before the auxiliary agent is introduced into the exhaust.

3. The method according to claim 2, wherein the fluid is drawn from a tank and supplied to the exhaust via lines, and wherein the stimulation occurs in a partial region of the tank or in a fluid volume contained in the lines so that a sufficient quantity of the substance can be distributed in the fluid volume in order to achieve a uniform freezing point reduction.

4. The method according to claim 3, further comprising the step of supplying heat to produce the stimulation.

5. The method according to claim 1, wherein the fluid is drawn from a tank and supplied to the exhaust via lines, and wherein the stimulation occurs in a partial region of the tank or in a fluid volume contained in the lines so that a sufficient quantity of the substance can be distributed in the fluid volume in order to achieve a uniform freezing point reduction.

6. The method according to claim 5, further comprising the step of supplying heat to produce the stimulation.

7. The method according to claim 6, wherein heat is supplied for a time to heat the partial region of the fluid to a temperature above 60° Celsius.

8. The method according to claim 7, wherein due to a spatial distribution, the supply of heat causes only a slight temperature increase in the fluid volume over time.

9. The method according to claim 8, wherein the slight temperature increase lies in the range between 5 Kelvin and 50 Kelvin.

10. The method according to claim 5, further comprising the step of measuring the concentration of the substance in the fluid and/or the temperature of the fluid, and establishing the intensity and/or duration of the stimulation as a function of the concentration of the substance and/or the temperature.

11. The method according to claim 1, further comprising the step of supplying heat to produce the stimulation.

12. The method according to claim 11, wherein due to a spatial distribution, the supply of heat causes only a slight temperature increase in the fluid volume over time.

13. The method according to claim 12, wherein the slight temperature increase lies in the range between 5 Kelvin and 50 Kelvin.

14. The method according to claim 11, further comprising the step of measuring the concentration of the substance in the fluid and/or the temperature of the fluid, and establishing the intensity and/or duration of the stimulation as a function of the concentration of the substance and/or the temperature.

15. The method according to claim 1, wherein the freezing point is reduced by 10 to 30 Kelvin.

16. The method according to claim 1, further comprising the step of measuring the concentration of the substance in the fluid and/or the temperature of the fluid, and establishing the intensity and/or duration of the stimulation as a function of the concentration of the substance and/or the temperature.

17. The method according to claim 16, wherein the concentration and/or the temperature is measured in the partial region.

18. The method according to claim 1, wherein the substance is a gas that is soluble in the fluid.

19. The method according to claim 1, wherein a urea/water solution is used as the fluid and ammonia is the substance.

20. A device for treatment of the exhaust of an internal combustion engine in which a fluid (1) is used as an auxiliary agent for the treatment, the device comprising means (2, 3, 4, 5, 3a, 4a, 5a, 14) for at least occasionally stimulating a partial chemical conversion of the auxiliary agent into a substance that reduces the freezing point of the fluid, the means being disposed and/or embodied so as to permit the stimulation to occur when the temperature of the fluid falls below a critical value.

* * * * *